United States Patent
Oka et al.

(10) Patent No.: US 7,009,029 B2
(45) Date of Patent: Mar. 7, 2006

(54) POLYAMIDE COMPOSITION

(75) Inventors: Hideaki Oka, Okayama (JP); Hideharu Matsuoka, Ibaraki (JP); Toru Kuki, Ibaraki (JP)

(73) Assignee: Kuraray Co., Ltd., Kurashiki (JP)

( * ) Notice: Subject to any disclaimer, the term of this patent is extended or adjusted under 35 U.S.C. 154(b) by 55 days.

(21) Appl. No.: 10/464,474

(22) Filed: Jun. 19, 2003

(65) Prior Publication Data

US 2004/0034152 A1 Feb. 19, 2004

(30) Foreign Application Priority Data

Jun. 21, 2002 (JP) .............................. 2002-181283

(51) Int. Cl.
- *C08G 69/26* (2006.01)
- *C08K 3/00* (2006.01)
- *C08L 77/00* (2006.01)
- *C08L 3/22* (2006.01)

(52) U.S. Cl. ...................... 528/310; 528/322; 528/332; 528/335; 528/336; 528/340; 524/447; 524/514; 524/538; 524/606; 524/607; 524/497; 525/66; 525/182; 525/432; 525/420; 523/200

(58) Field of Classification Search ................ 528/310, 528/322, 340, 335, 336; 524/444, 606, 607, 524/447, 514, 538, 404, 420, 431, 432, 433; 525/432, 66, 182, 420; 523/200, 204, 205, 523/209

See application file for complete search history.

(56) References Cited

U.S. PATENT DOCUMENTS

| | | | | |
|---|---|---|---|---|
| 5,478,878 A | * | 12/1995 | Nagaoka et al. | ............ 524/430 |
| 5,670,608 A | * | 9/1997 | Oka et al. | .................... 528/322 |
| 6,414,064 B1 | * | 7/2002 | Matsuoka et al. | .......... 524/404 |
| 6,887,930 B1 | * | 5/2005 | Uchida et al. | .............. 524/430 |

FOREIGN PATENT DOCUMENTS

| | | |
|---|---|---|
| EP | 0 659 799 | 6/1995 |
| JP | 59-113049 | 6/1984 |
| JP | 3-84060 | 4/1991 |

* cited by examiner

*Primary Examiner*—P. Hampton Hightower
(74) *Attorney, Agent, or Firm*—Oblon, Spivak, McClelland, Maier & Neustadt, P.C.

(57) ABSTRACT

Provided is a polyamide composition comprising 100 parts by weight of (A) a polyamide having dicarboxylic acid units containing 60 to 100 mol % of terephthalic acid units, and diamine units containing 60 to 100 mol % of 1,9-nonanediamine units and/or 2-methyl-1,8-octanediamine units, and 5 to 100 parts by weight of (B) a titanium oxide with an average particle size of 0.1 to 0.5 μm. The polyamide composition shows excellent heat resistance enough to withstand the SMT process, and gives a molded article with excellent whiteness and surface-reflectance.

18 Claims, No Drawings

POLYAMIDE COMPOSITION

BACKGROUND OF THE INVENTION

1. Field of the Invention

The present invention relates to a polyamide composition that gives a molded article with excellent whiteness and surface-reflectance.

2. Description of the Related Art

Because of their low power consumption, long service life and other advantages, new light sources such as LEDs (light emitting diodes) and organic electroluminescence (EL) devices have been in increasing demand for illumination, display devices and other such applications in recent years. LEDs, in particular, have been used in a variety of applications including cellular phones and other mobile communications devices, displays, automobile instrument panels, signaling devices and other electric household appliances. Electrical and electronic products such as these have been becoming lighter, thinner and more compact in response to demands for more attractive designs, easier portability, and so forth.

As a key technique to achieve this reduction in size and weight, SMT (surface mounting technology) has become very popular and is used in many electrical and electronic products. This has markedly increased the mounting density on electronic base, and has led to reductions in size and weight that had never been achieved.

When SMT is applied, the electronic parts mounted on an electronic base are entirely subjected to heating and soldering. Therefore they must be made from a material stable at the soldering temperature (approximately 240° C.). Furthermore, lead-free solder has recently become in major use due to environmental regulations, and tin-silver alloys and the like have come into use. These lead-free solders have a higher melting point than conventional lead solder, which means that the soldering temperature is made higher (approximately 260° C.). Materials that can be used in applications such as these are limited to resins such as LCP (liquid crystal polymer), PPS (polyphenylene sulfide) and heat-resistant polyamide.

LEDs are not the exception, and also must be heat resistant enough to withstand SMT. An LED is generally constituted of a semiconductor part that emits light, a lead wire, a reflector that also serves as a housing, and a transparent sealant that seals the semiconductor part. Of these components, the reflector may be made from a variety of materials such as ceramics or heat-resistant plastics. However, productivity is a problem with ceramics, and with heat-resistant plastics the problem is a decrease in optical reflectivity caused by the color change during the injection molding process, during the thermosetting of the sealant, or under the actual environmental condition in use.

The present inventors have made several patent applications relating to materials based on semi-aromatic polyamides that are heat resistant enough to withstand SMT. For instance, Japanese Patent Application Laid-Open No. Hei7-228776 discloses a composition that has excellent heat resistance as well as excellent mechanical strength, toughness, low water absorption, chemical resistance, hot water resistance, light-weightness and moldability, comprising 100 parts by weight of a polyamide composed of a dicarboxylic acid component containing mainly terephthalic acid, and a diamine component containing mainly 1,9-nonanediamine, and 0.5 to 200 parts by weight of (i) a filler with an average particle size of 0.1 to 200 µm, selected from the group consisting of silica, silica-alumina, alumina, talc, graphite, titanium dioxide, molybdenum disulfide and polytetrafluoroethylene, or 0.5 to 200 parts by weight of (ii) a fibrous filler with an average length of 0.1 to 200 mm, selected from the group consisting of wholly aromatic polyamide fibers, glass fibers, carbon fibers and boron fibers. Japanese Patent Application Laid-Open No. 2000-204244 discloses a composition that has excellent heat resistance at humidified state, dimensional stability and surface smoothness, and which gives a molded article with an attractive surface, comprising 100 parts by weight of a polyamide composed of a dicarboxylic acid component containing mainly terephthalic acid, and a diamine component containing mainly an aliphatic alkylenediamine having 6 to 18 carbon atoms, and 0.1 to 120 parts by weight of an inorganic filler with an average particle size of 2 µm or less. In addition, Japanese Patent Application Laid-Open No. Hei3-72565 discloses a composition suitable for infrared reflow-process, comprising 100 parts by weight of a resin component containing mainly a semiaromatic polyamide which has an intrinsic viscosity of 0.5 to 3.0 dL/g and a melting point of at least 280° C. and 0.1 to 5 parts by weight of a white pigment having an averagae particle size of 0.1 to 200 µm, preferably 1 to 100 µm, such as silica, silica alumina, alumina, titanium dioxide, talc and zinc oxide.

Even with these compositions, it has been found that the properties thereof need to be further improved, and, specifically, the surface-reflectance of a molded article obtained therefrom must be improved, in view of the application for the manufacture of the above-mentioned reflectors.

SUMMARY OF THE INVENTION

It is, therefore, an object of the present invention to provide a polyamide composition that is heat resistant enough to withstand the SMT process and gives a molded article having excellent surface-reflectance.

The present invention provides a polyamide composition comprising 100 parts by weight of (A) a polyamide composed of dicarboxylic acid units containing 60 to 100 mol % of terephthalic acid units, and diamine units containing 60 to 100 mol % of 1,9-nonanediamine units and/or 2-methyl-1,8-octanediamine units, and 5 to 100 parts by weight of (B) a titanium oxide with an average particle size of 0.1 to 0.5 µm.

DETAILED DESCRIPTION OF THE INVENTION

The dicarboxylic acid units (a) that constitute the polyamide (A) comprises 60 to 100 mol % of terephthalic acid units. If the content of the terephthalic acid unit in the dicarboxylic acid units (a) is less than 60 mol %, the heat resistance of the resulting polyamide composition may be reduced. The content of the terephthalic acid unit in the dicarboxylic acid units (a) is preferably from 75 to 100 mol %, and more preferably from 90 to 100 mol %.

The dicarboxylic acid units (a) can contain not more than 40 mol % of other dicarboxylic acid units besides terephthalic acid unit. Examples of these other dicarboxylic acid units include units derived from aliphatic dicarboxylic acids such as malnic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid and suberic acid; alicyclic dicarboxylic acids such as 1,3-cyclopentanedicarboxylic acid and 1,4-cyclohexanedicarboxylic acid; and aromatic dicarboxylic acid such as isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid. These can be used singly or in combinations of two or more types. Of these, units derived from aromatic dicarboxylic acids are preferred. The content of these other dicarboxylic acid units in the dicarboxylic acid units (a) is preferably not more than 25 mol %, and more preferably not more than 10 mol %. Units derived from polyfunctionalized carboxylic acids such as trimellitic acid, trimesic acid and pyromellitic acid may also be contained to the extent that melt molding is still possible.

The diamine units (b) that constitute the polyamide (A) contain 60 to 100 mol % of 1,9-nonanediamine units and/or 2-methyl-1,8-octanediamine units. If the content of the 1,9-nonanediamine units and/or the 2-methyl-1,8-octanediamine units in the diamine unit (b) is less than 60 mol %, the heat resistance, low water absorption, chemical resistance and other properties of the resulting polyamide composition may be reduced. The content of the 1,9-nonanediamine units and/or the 2-methyl-1,8-octanediamine units in the diamine unit (b) is preferably from 75 to 100 mol %, and more preferably from 90 to 100 mol %.

The molar ratio of the 1,9-nonanediamine units based on the 2-methyl-1,8-octanediamine units falls preferably between 100/0 and 20/80, more preferably between 100/0 and 60/40, and still more preferably between 100/0 and 70/30.

The diamine units (b) can contain not more than 40 mol % of other diamine units besides 1,9-nonanediamine unit and 2-methyl-1,8-octanediamine unit. Examples of these other diamine units include units derived from linear aliphatic diamines such as 1,6-hexanediamine, 1,7-heptanediamine, 1,8-octanediamine, 1,10-decanediamine, 1,11-undecanediamine and 1,12-dodecanediamine; branched aliphatic diamines such as 2-methyl-1,5-pentanediamine, 3-methyl-1,5-pentanediamine, 2,2,4-trimethyl-1,6-hexanediamine, 2,4,4-trimethyl-1,6-hexanediamine and 5-methyl-1,9-nonanediamine; alicyclic diamines such as cyclohexanediamine, methylcyclohexanediamine, isophoronediamine, bis(4-aminocyclohexyl)methane, norbornanedimethylamine and tricyclodecanedimethylamine; and aromatic diamines such as p-phenylenediamine, m-phenylenediamine, m-xylylenediamine, p-xylylenediamine, 4,4'-diaminodiphenylsulfone and 4,4'-diaminodiphenyl ether. These can be used singly or in combinations of two or more types. Of these, units derived from 1,6-hexanediamine, 1,7-heptanediamine, 1,8-octanediamine, 1,10-decanediamine or 1,12-dodecanediamine are preferable. The content of these other diamine units in the diamine unit (b) is preferably not more than 40 mol %, more preferably not more than 25 mol %, and still more preferably not more than 10 mol %.

The polyamide (A) has preferably at least 10% of the terminal groups in its molecular chains blocked with a terminal-blocking agent. The proportion in which the terminal groups of the molecular chains are blocked with a terminal-blocking agent (terminal blocking ratio) is preferably at least 40%, more preferably at least 60%, and still more preferably at least 70%. The polyamide composition having excellent melt stability, hot water resistance and other properties can be obtained when a polyamide with a terminal blocking ratio of at least 10% is used.

The terminal blocking ratio of the polyamide (A) can be determined by measuring the numbers of terminal carboxyl groups, terminal amino groups and terminal groups blocked with a terminal blocking agent present in the polyamide (A), and calculating from the equation (1) given below. In terms of accuracy and simplicity, it is preferable to find the number of the various terminal groups on the basis of the integrated values for the characteristic signals corresponding to the various terminal groups using $^1$H-NMR.

$$\text{Terminal blocking ratio } (\%) = [(A-B)/A] \times 100 \tag{1}$$

In the equation (1), A is the total number of the terminal groups in the molecular chains (this is usually equal to two times the number of polyamide molecules), and B is the total number of both the terminal carboxyl groups and the terminal amino groups remaining unblocked.

There are no particular restrictions on the terminal blocking agent, as long as it is a monofunctional compound that is reactive with the amino groups or the carboxyl groups present in the terminals of the polyamide. Monocarboxylic acids and monoamines are preferable in view of their high reactivity and the stability of the blocked terminals, and monocarboxylic acids are more prefereble because they are easier to handle. In addition, acid anhydrides, monoisocyanates, mono-acid halides, monoesters, monoalcohols, and so forth can also be used.

There are no particular restrictions on the monocarboxylic acid used as a terminal blocking agent, as long as it is reactive with amino groups. Examples of the monocarboxylic acid include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any of these. Of these, acetic acid, propionic acid, butyric acid, valeric acid, caproic acid, caprylic acid, lauric acid, tridecanoic acid, myristic acid, palmitic acid, stearic acid and benzoic acid are preferred because of their high reactivity, stability of the blocked terminals, low cost, and so on.

There are no particular restrictions on the monoamine used as a terminal blocking agent, as long as it is reactive with carboxyl groups. Examples of the monoamine include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and mixtures of any of these. Of these, butylamine, hexylamine, octylamine, decylamine, stearylamine, cyclohexylamine and aniline are preferred because of their high reactivity, high boiling point, stability of the blocked terminals, low cost, and so on.

The polyamide (A) can be manufactured by any known method for manufacturing crystalline polyamides. For example, it can be manufactured by solution polymerization or interfacial polymerization in which an acid chloride and a diamine are used as raw materials, or by melt polymerization, solid-phase polymerization, or melt extrusion polymerization in which a dicarboxylic acid and a diamine are used as raw materials.

In the manufacture of the polyamide (A), phosphoric acid, phosphorous acid, hypophosphorous acid, salts and esters thereof can be added as a catalyst, for example, in addition to the above-mentioned terminal blocking agent. Examples of the above-mentioned salts and esters include salts of phosphoric acid, phosphorous acid or hypophosphorous acid with a metal such as potassium, sodium, magnesium, vanadium, calcium, zinc, cobalt, manganese, tin, tungsten, germanium, titanium or antimony; ammonium salts of phosphoric acid, phosphorous acid or hypophosphorous acid; and ethyl esters, isopropyl esters, butyl esters, hexyl esters, isodecyl esters, octadecyl esters, decyl esters, stearyl esters and phenyl esters of phosphoric acid, phosphorous acid or hypophosphorous acid.

The intrinsic viscosity [η] of the polyamide (A), measured in concentrated sulfuric acid at 30° C., is preferably from 0.4 to 3.0 dL/g, more preferably from 0.6 to 2.0 dL/g, and still more preferably from 0.8 to 1.8 dL/g. If a polyamide having an intrinsic viscosity of less than 0.4 dL/g is used, the resulting polyamide composition tends to give a molded article having reduced mechanical properties. On the other hand, if a polyamide having an intrinsic viscosity of higher than 3.0 dL/g is used, the resulting polyamide composition tends to have less flowability and poor moldability.

Examples of the titanium oxide (B) used in the present invention include titanium (II) oxide [TiO], titanium (III) oxide [$Ti_2O_3$] and titanium (IV) oxide [$TiO_2$]. Of these, titanium (IV) oxide is preferable. The titanium oxide (B) is usually one having a rutile crystal structure.

The average particle size of the titanium oxide (B) must fall between 0.1 and 0.5 μm. The titanium oxide (B) must also be used in an amount of 5 to 100 parts by weight per 100 parts by weight of the polyamide (A).

By adjusting the average particle size of the titanium oxide (B) and the amount thereof within the above ranges, a polyamide composition that gives a molded article with excellent whiteness and surface-reflectance can be obtained.

The average particle size of the titanium oxide (B) falls preferably between 0.15 and 0.4 μm, and more preferably between 0.2 and 0.3 μm.

The titanium oxide (B) is used in an amount of preferably 5 to 70 parts by weight, and more preferably 10 to 40 parts by weight per 100 parts by weight of the polyamide (A).

The titanium oxide (B) may be subjected to a surface modification prior to use. Examples of the surface modifier include metal oxides such as silica, alumina and zinc oxide; and organic compounds such as silane coupling agents, titanium coupling agents, organic acids, polyols and silicones.

A commercially available titanium oxide can also be used as the titanium oxide (B). Furthermore, titanium oxide having the average particle size of the above-described range, which is obtained by subjecting a titanium oxide in block form, or with a large average particle size, to grinding and optional classification with a sieve or the like, can be used.

The polyamide composition of the present invention can further contain (C) at least one reinforcing agent selected from the group consisting of fibrous fillers and needle-like fillers. The reinforcing agent (C) can improve the moldability of the resulting polyamide composition and the mechanical strength of the molded article obtained from the resulting polyamide composition. Examples of fibrous fillers include glass fibers, carbon fibers, boron fibers, aramid fibers and liquid crystal polyester fibers, while examples of needle-like fillers include whiskers of potassium titanate, whiskers of aluminum borate, whiskers of zinc oxide and whiskers of calcium carbonate.

From the standpoints of the mechanical strength of a molded article of the resulting polyamide composition and the production cost of the resulting polyamide composition, glass fibers are preferable as the reinforcing agent (C). On the other hand, from the standpoint of the surface smoothness of a molded article of the resulting polyamide composition, needle-like fillers such as whiskers are preferable. In addition, from the standpoint of the sliding properties of a molded article of the resulting polyamide composition, aramid fibers or liquid crystal polyester fibers are preferable.

The amount of the reinforcing agent (C) is preferably within a range of 20 to 100 parts by weight, and more preferably within a range of 25 to 50 parts by weight per 100 parts by weight of the polyamide (A).

In order to improve the dispersibility of the reinforcing agent (C) in the polyamide (A), or to improve its adhesion to the polyamide (A), the surface of the reinforcing agent (C) is preferably treated with a silane coupling agent and/or a resin such as acrylic resin, urethane resin, epoxy resin, or the like.

In addition, the polyamide composition of the present invention may also contain powdery fillers other than the titanium oxide (B) such as talc, mica, kaolin, clay, calcium carbonate, silica, aluminum borate and montmorillonite.

A light stabilizer (D) can be added to the polyamide composition of the present invention for the purpose of preventing the color change and suppressing the reduction of optical reflectivity.

Examples of the light stabilizers (D) include compounds having UV absorbing effect such as benzophenone compounds, salicylate compounds, benzotriazole compounds, acrylonitrile compounds, and other conjugated compounds; and compounds having radical trapping capability such as metal complexes, hindered amine compounds and hindered phenol compounds. Compounds having amide bonds in their molecules are particularly favorable because they have excellent heat resistance and excellent dispersibility into the polyamide (A). The light stabilizing effect will be even better when a compound having UV absorbing effect is used together with a compound having radical trapping capability.

The light stabilizer (D) is used in an amount of preferably not more than 2 parts by weight, and more preferably from 0.05 to 2 parts by weight per 100 parts by weight of the polyamide (A), in view of the cost and the light stabilizing effect.

A hindered phenol compound, phosphorus compound, sulfur compound, or other antioxidant can also be added to the polyamide composition of the present invention in order to prevent the color change or the decrease in molecular weight during the molding process.

A metallic soap, a higher aliphatic ester or a partially saponified product thereof, a low molecular weight polyolefin, a silicone oil, a fluorine-based oil, or other such releasing agent is preferably added to the polyamide composition of the present invention for the purpose of improving the moldability. In particular, a low molecular weight polyethylene is preferable because it shows a good mold release effect and low mold corrosion.

The polyamide composition of the present invention can, if necessary, optionally contain a flame retardant, a colorant, an antistatic agent, a plasticizer, a nucleating agents, and other such additives; and/or PA612, PA12, and other such aliphatic polyamides; PPS (polyphenylene sulfide), PPE (polyphenylene ether), LCP (liquid crystal polymers), and various other types of polymers.

The polyamide composition of the present invention can be prepared by blending the above-described components by a conventional method.

Examples of such a conventional method include (1) a method in which the various components are added during the polycondensation of the polyamide (A), (2) a method in which the polyamide (A) and other components are dry blended, and (3) a method in which the polyamide (A) and other components are melt kneaded in an extruder. Of these, a method which employs melt kneading with an extruder is advantageous because it gives a uniform polyamide composition with easy operations. The extruder used is preferably a twin screw type, and the melt kneading temperature is preferably at least 5° C. higher than the melting point of the polyamide and not higher than 350° C.

The polyamide composition of the present invention is applied for the production of various molded articles by conventional molding methods used for thermoplastic resin compositions, such as injection molding, extrusion molding, press molding, blow molding, calender molding and casting. A combination of the above molding methods can also be employed. Injection molding is particularly favorable in view of the cost of production, easy operation and applicability for mass production, etc.

Composite molding can also be conducted using the polyamide composition of the present invention together with another polymer. Further, the polyamide composition of the present invention can be formulated into a composite article together with a metal frame, a fabric, or the like.

Molded articles obtained from the polyamide composition of the present invention can be used in a variety of applications for electronic parts such as connectors, switches, relays and printed wiring boards; reflectors such as lamp reflectors; sliding parts such as gears and cams; automobile parts such as air intake manifolds; sinks and other such plumbing-related parts; various decorative parts; films, sheets, fibers, and so forth.

The polyamide composition of the present invention gives a molded article with excellent whiteness and surface-reflectance. The whiteness (Hunter whiteness) of a molded article obtained from the polyamide composition of the present invention is usually at least 92, and preferably at least 94. In addition, the molded article obtained from the polyamide composition of the present invention shows excellent heat resistance and excellent light stability under the actual environmental condition in use. Therefore, a molded article obtained from the polyamide composition of the present invention can be used favorably for parts having light-reflection property, such as reflectors for LEDs, lighting fixtures, and so on.

EXAMPLES

The present invention will now be described in specific terms through examples, but the present invention is not limited by these examples in any way.

In the following examples and comparative examples, surface smoothness, color tone, change in color tone, and solder resistance were measured or evaluated by the following methods.

Surface Smoothness:

A plate of 2 mm in thickness, 40 mm in width and 100 mm in length was produced by injection molding of the polyamide composition at a temperature approximately 20° C. higher than the melting point of the polyamide composition, in which the mold temperature was set at 140° C. The arithmetical mean roughness (Ra) of the plate was measured with a surface roughness meter ("SE-30D", made by Kosaka Laboratory Ltd.).

Color Tone:

A plate of 2 mm in thickness, 40 mm in width and 100 mm in length was produced by injection molding of the polyamide composition at a temperature approximately 20° C. higher than the melting point of the polyamide composition, in which the mold temperature was set at 140° C. Using an "SM color computer" (made by SUGA Test Instruments), the lightness (value: L), redness (value: a), and yellowness (value: b) of the plate were determined as set forth in JIS Z 8730.

The whiteness (Hunter whiteness) was also calculated from the following equation.

$$W=100-[(100-L)^2+a^2+b^2]^{1/2}$$

The greater the whiteness (W) is, the higher the surface-reflectance becomes.

Change in Color Tone:

A plate of 2 mm in thickness, 40 mm in width and 100 mm in length was produced by injection molding of the polyamide composition at a temperature approximately 20° C. higher than the melting point of the polyamide composition, in which the mold temperature was set at 140° C. The plate was subjected to i) heating at 170° C. for 2 hours in a hot air oven or ii) UV irradiation at room temperature under air for 24 hours with a UV irradiation apparatus ("Toscure 401", made by Toshiba Lighting & Techonology Corporation). The lightness (L) of the plate after being heated or irradiated with UV rays was measured by the method given above, and the difference (ΔL) from the lightness (L) prior to heating or UV irradiation was determined. The smaller this difference is, the less change there is in color tone.

Solder Resistance:

A plate (test piece) of 0.5 mm in thickness, 10 mm in width and 30 mm in length was produced by injection molding of the polyamide composition at a temperature approximately 20° C. higher than the melting point of the polyamide composition and left for 100 hours at a temperature of 40° C. and a relative humidity of 95%. The test piece was heated for 1 minute at 150° C. in an infrared heating oven, then the temperature was raised at a rate of 100° C./minute. The temperature at which the plate underwent deformation or swelling was determined. The temperature was referred to as "solder resistant temperature" and used as an index of the solder resistance.

The following species were used in the examples and the comparative examples.

Polyamide:

PA9T:

A polyamide with an intrinsic viscosity [η] (measured at 30° C. in concentrated sulfuric acid) of 0.9 dL/g, a melting point of 302° C. and a terminal blocking ratio of 77% (terminal blocking agent: benzoic acid), prepared according to the method as described in Example 6 of the U.S. Pat. No.5,670,608, in which the dicarboxylic acid units were terephthalic acid units, and the diamine units consisted of 80 mol % of 1,9-nonanediamine units and 20 mol % of 2-methyl-1,8-octanediamine units.

PA6T:

A polyamide with an intrinsic viscosity [η] (measured at 30° C. in concentrated sulfuric acid) of 1.0 dL/g, a melting point of 320° C. and a terminal blocking ratio of 42% (terminal blocking agent: benzoic acid), prepared according to the method as described in Comparative Example 5 in the U.S. Pat. No. 5,670,608, in which the carboxylic acid units consisted of 70 mol % of terephthalic acid units and 30 mol % of isophthalic acid units, and the diamine units were 1.6-hexanediamine units.

PA46:
  "TW300", made by DSM Engineering Plastics

Titanium Oxide:
  a: "TIPAQUE CR-63" (average particle size:0.2 μm), made by ISHIHARA SANGYO KAISHA, LTD.

Reinforcing Agent:
  b: "CS-3J-324" (glass fiber), made by Nitto Boseki Co., Ltd.
  c: "ALBOREX YS3A" (whisker of aluminum borate), made by Shikoku Chemicals Corporation.
  d: "ZONO HIGE" (Zonotolite [whisker of calcium silicate]), made by Ube Material Industries, Ltd.

Light Stabilizer:
  e: "Nylostab S-EED" (2-ethyl-2'-ethoxy-oxal anilide), made by Clariant (Japan) KK.
  f: "Sanduvor VSU" (1,3-benzenedicarboxamide-N,N'-bis (2,2,6,6-tetramethyl-4-piperidyl)), made by Clariant (Japan) KK.

Releasing Agent:
  g: "Hi-Wax 200P" (low molecular weight polyethylene), made by MITSUI CHEMICALS, INC.

Examples 1 to 5 and Comparative Examples 1 to 3

The polyamides shown in Table 1 were dried under reduced pressure for 24 hours at 120° C., after which each was dry blended with the titanium oxide, the light stabilizer and the releasing agent in the amounts shown in Table 1. The mixtures thus obtained were each fed into a twin-screw extruder (screw diameter: 30 mm, L/D=28, cylinder temperature: 320° C., rotating speed: 150 rpm) from the hopper and, at the same time, the reinforcing agent was added from a side feeder in the amount shown in Table 1. The resulting mixtures were melt kneaded and extruded as a strand. The strand was cut into pellets with a pelletizer to give polyamide compositions. The resulting polyamide compositions were formulated into test pieces of a specific shape according to the method described above, and tested for the various properties. The results are given in Table 1.

TABLE 1

| Composition (parts by weight) | Example | | | | | Comparative Example | | |
|---|---|---|---|---|---|---|---|---|
| | 1 | 2 | 3 | 4 | 5 | 1 | 2 | 3 |
| Polyamide | | | | | | | | |
| PA9T | 100 | 100 | 100 | 100 | 100 | 100 | | |
| PA6T | | | | | | | | 100 |
| PA46 | | | | | | | 100 | |
| Titanium oxide | | | | | | | | |
| a | 15 | 33 | 15 | 40 | 15 | 3 | 15 | 15 |
| Reinforcing agent | | | | | | | | |
| b | 30 | | | 60 | | 25 | 30 | 30 |
| c | | 30 | | | | | | |
| d | | | 30 | | | | | |
| Light stabilizer | | | | | | | | |
| e | 0.3 | 0.3 | 0.3 | | 0.3 | 0.3 | 0.3 | 0.3 |
| f | | 0.3 | 0.3 | 0.3 | 0.3 | 0.3 | 0.3 | 0.3 |

TABLE 1-continued

| Composition (parts by weight) | Example | | | | | Comparative Example | | |
|---|---|---|---|---|---|---|---|---|
| | 1 | 2 | 3 | 4 | 5 | 1 | 2 | 3 |
| Releasing agent | | | | | | | | |
| g | 0.2 | 0.2 | 0.2 | 0.2 | 0.2 | 0.2 | 0.2 | 0.2 |
| Properties | | | | | | | | |
| Ra (μm) | 0.1 | 0.02 | 0.02 | 0.1 | 0.1 | 0.1 | 0.1 | 0.1 |
| Color tone | | | | | | | | |
| L | 94.5 | 96.3 | 95.2 | 96.8 | 93.0 | 89.0 | 93.4 | 94.0 |
| a | −1.0 | −0.9 | −1.1 | −1.0 | −1.0 | −1.2 | −1.3 | −0.9 |
| b | 2.3 | 2.2 | 2.4 | 2.3 | 2.2 | 2.7 | 4.3 | 3.8 |
| whiteness (W) | 94.0 | 95.6 | 94.5 | 95.9 | 92.5 | 88.6 | 92.0 | 92.8 |
| Change in color tone (ΔL) | | | | | | | | |
| Heating | 1.0 | 0.2 | 0.2 | 0.3 | 0.2 | 12 | 15 | 8.1 |
| UV irradiation | 2.1 | 1.1 | 1.0 | 1.7 | 1.1 | 13 | 3.3 | 3.1 |
| solder resistant temperature (° C.) | 265 | 270 | 265 | 270 | 250 | 265 | <240 | 255 |

As is apparent from the foregoing, the present invention can provide a polyamide composition that gives a molded article with excellent whiteness and surface-reflectance.

Having now fully described the invention, it will be apparent to one of the ordinary skill in the art that many changes and modifications can be made thereto without departing from the spirit or scope of the invention as set forth herein.

This application is based on Japanese Patent Application No. 2002-181283, filed on Jun. 21, 2002, the entire contents of which are hereby incorporated by reference.

What is claimed is:

1. A polyamide composition, comprising
   100 parts by weight of (A) a polyamide having dicarboxylic acid units comprising 60 to 100 mol % of terephthalic acid units, and diamine units comprising 60 to 100 mol % of 1,9-nonanediamine units and/or 2-methyl-1,8-octanediamine units; and
   5 to 100 parts by weight of (B) a titanium oxide with an average particle size of 0.1 to 0.5 μm.

2. The polyamide composition according to claim 1, further containing at least one reinforcing agent (C) selected from the group consisting of fibrous fillers and needle-like fillers, in an amount of 20 to 100 parts by weight per 100 parts by weight of the polyamide (A).

3. The polyamide composition according to claim 1 or 2, further containing a light stabilizer (D), in an amount of not more than 2 parts by weight per 100 parts by weight of the polyamide (A).

4. A molded article composed of a polyamide composition, wherein the polyamide composition comprises:
   100 parts by weight of (A) a polyamide having dicarboxylic acid units comprising 60 to 100 mol % of terephthalic acid units, and diamine units comprising 60 to 100 mol % of 1,9-nonanediamine units and/or 2-methyl-1,8-octanediamine units; and
   5 to 100 parts by weight of (B) titanium oxide with an average particle size of 0.1 to 0.5 μm.

5. The molded article according to claim 4, wherein the polyamide composition further contains at least one reinforcing agent (C) selected from the group consisting of fibrous fillers and needle-like fillers, in an amount of 20 to 100 parts by weight per 100 parts by weight of the polyamide (A).

6. The molded article according to claim 4 or 5, wherein the polyamide composition further contains a light stabilizer (D), in an amount of not more than 2 parts by weight per 100 parts by weight of the polyamide (A).

7. A molded article composed of the polyamide composition, wherein the polyamide composition has a whiteness of at least 92 and comprises:
   100 parts by weight of (A) a polyamide having dicarboxylic acid units comprising 60 to 100 mol % of terephthalic acid units, and diamine units comprising 60 to 100 mol % of 1,9-nonanediamine units and/or 2-methyl-1,8-octanediamine units; and
   5 to 100 parts by weight of (B) titanium oxide with an average particle size of 0.1 to 0.5 µm.

8. The molded article according to claim 7, wherein the polyamide composition further contains at least one reinforcing agent (C) selected from the group consisting of fibrous fillers and needle-like fillers, in an amount of 20 to 100 parts by weight per 100 parts by weight of the polyamide (A).

9. The molded article according to claim 7 or 8, wherein the polyamide composition further contains a light stabilizer (D), in an amount of not more than 2 parts by weight per 100 parts by weight of the polyamide (A).

10. A reflector composed of the polyamide composition, wherein the polyamide composition comprises:
    100 parts by weight of (A) a polyamide having dicarboxylic acid units comprising 60 to 100 mol % of terephthalic acid units, and diamine units comprising 60 to 100 mol % of 1,9-nonanediamine units and/or 2-methyl-1,8-octanediamine units; and
    5 to 100 parts by weight of (B) titanium oxide with an average particle size of 0.1 to 0.5 µm.

11. The reflector according to claim 10, wherein the polyamide composition further contains at least one reinforcing agent (C) selected from the group consisting of fibrous fillers and needle-like fillers, in an amount of 20 to 100 parts by weight per 100 parts by weight of the polyamide (A).

12. The reflector according to claim 10 or 11, wherein the polyamide composition further contains a light stabilizer (D), in an amount of not more than 2 parts by weight per 100 parts by weight of the polyamide (A).

13. A reflector composed of a polyamide composition, wherein the polyamide composition has a whiteness of at least 92 and comprises:
    100 parts by weight of (A) a polyamide having dicarboxylic acid units comprising 60 to 100 mol % of terephthalic acid units, and diamine units comprising 60 to 100 mol % of 1,9-nonanediamine units and/or 2-methyl-1,8-octenediamine units; and
    5 to 100 parts by weight of (B) titanium oxide with an average particle size of 0.1 to 0.5 µm.

14. The reflector according to claim 13, wherein the polyamide composition further contains at least one reinforcing agent (C) selected from the group consisting of fibrous fillers and needle-like fillers, in an amount of 20 to 100 parts by weight per 100 parts by weight of the polyamide (A).

15. The reflector according to claim 13 or 14, wherein the polyamide composition further contains a light stabilizer (D), in an amount of not more than 2 parts by weight per 100 parts by weight of the polyamide (A).

16. The polyamide composition according to claim 1, wherein the titanium dioxide has an average particle size of 0.15 µm to 0.4 µm.

17. The molded article according to claim 4, wherein the titanium dioxide has an average particle size of 0.15 µm to 0.4 µm.

18. The reflector according to claim 10, wherein the titanium dioxide has an average particle size of 0.15 µm to 0.4 µm.

* * * * *